United States Patent
Carter

[11] Patent Number: 5,874,001
[45] Date of Patent: Feb. 23, 1999

[54] GROUND WATER REMEDIATION METHOD

[75] Inventor: Sean R. Carter, Lawtons, N.Y.

[73] Assignee: Matrix Environmental Technologies, Orchard Park, N.Y.

[21] Appl. No.: 710,091

[22] Filed: Sep. 11, 1996

[51] Int. Cl.$^6$ ............................................. C02F 3/02
[52] U.S. Cl. .......................... 210/610; 210/620; 210/747; 210/758; 405/128
[58] Field of Search .................... 210/610, 611, 210/620, 747, 758; 405/128

[56] References Cited

U.S. PATENT DOCUMENTS

| | | | |
|---|---|---|---|
| 5,037,240 | 8/1991 | Sherman | 405/128 |
| 5,133,625 | 7/1992 | Albergo et al. | 405/128 |
| 5,221,159 | 6/1993 | Billings et al. | |
| 5,277,518 | 1/1994 | Billings et al. | |
| 5,302,286 | 4/1994 | Semprini et al. | 210/747 |
| 5,332,502 | 7/1994 | Wickens et al. | 210/605 |
| 5,345,034 | 9/1994 | Corey | 405/128 |
| 5,362,400 | 11/1994 | Martinell | 210/747 |
| 5,472,294 | 12/1995 | Billings et al. | |
| 5,487,834 | 1/1996 | Carman et al. | 210/606 |
| 5,623,992 | 4/1997 | Shaw | 210/747 |

OTHER PUBLICATIONS

Oxygen–Enhanced in Situ Bioremediation in a Sand and Gravel Aquifer by Sean R. Carter and James E. Clark from in Situ Aeration: Air Sparging, Vioventing, and Related Process. Editors: Rober E. Hinchee, Ross N. Miller, and Paul C. Johnson, Batelle Press, 1995.

Primary Examiner—Jay H. Woo
Assistant Examiner—Betsey J. Morrison
Attorney, Agent, or Firm—Cumpston & Shaw

[57] ABSTRACT

A method and apparatus for in situ removal of biodegradable contaminants from ground water or soil, or both by injecting oxygen gas into ground water containing a biodegradable contaminant in a volume low enough to avoid migration or volatilization of the contaminant but high enough to enhance the rate of biodegradation of the contaminant are described.

8 Claims, 3 Drawing Sheets

GROUND WATER REMEDIATION METHOD

FIELD OF THE INVENTION

The invention relates to a method for in situ remediation of contaminated ground water and contaminated soil by injection of pure oxygen into the ground water and in particular to a method of remediating ground water and soil contaminated with petroleum products by injecting pure oxygen into the ground water in a volume low enough to avoid migration or volatilization of the petroleum product but high enough to enhance the rate of bidegradation of the petroleum product.

BACKGROUND OF THE INVENTION

Contamination of subsurface soil and ground water by petroleum products, including gasoline and fuel oils, is a recurring problem, particularly by leakage from underground storage tanks. In addition, spills and improper disposal of petroleum products cause many contaminated sites.

Among the diverse remediation technologies which have been developed to treat contaminated subsurface soil and ground water are the techniques of air sparging and bioremediation.

In general, air sparging involves the injection of high volumes of pressurized air into ground water through injection wells. The air flow through the ground water causes volatile contaminants to volatilize and migrate through the ground water and the vadose zone. To avoid contamination of the environment the ensuing vapors are directed to extraction wells and withdrawn from the wells under vacuum. The output of the withdrawal well is connected to a series of scrubbers, condensers and neutralizers which remove contaminants from the air stream.

Bioremediation relies on the ubiquitous microorganisms found in soil and ground water and in vadose zones which are capable of biodegrading the contaminants. Aerobic microorganisms convert hydrocarbon fuels into carbon dioxide and water. This method relies on oxygen availability and nutrients in the soil to support the microorganisms. Without enhancing the oxygen availability it is expensive and difficult to sustain a successful rate of biodegradation.

Combining the techniques of air sparging and bioremediation provides an integrated system which is capable of enhancing the bioremediation of the various zones of contamination underground by increased rates of biodegradation. Air contains 80% nitrogen and 20% oxygen and is not an efficient source of oxygen and requires high volumes of air to provide sufficient oxygen. This integrated system still causes the undesirable migration and volatilization of volatile contaminants through the vadose zone. Release of such vapors above ground must be controlled to meet air quality standards and this requires venting and extraction of the vapors. In addition high volume gas flow causes drying out of the zones and channeling which leads to progressively more leakage and escape of vapors and reduced efficiency of biodegradation. Drying out of the soil due to the air flow can render it biologically inactive. Channeling caused by high volume air flow reduces the efficiency of oxygen transfer to the aqueous phase and hence to the microorganisms. Maintaining a moist environment and avoiding channeling over the term of the operation are important for efficient biodegradation.

A pump-and-treat method of in situ bioremediation has been reported (Carter, S. R. and Clark, J. E.; Oxygen-Enhanced In Situ Bioremediation In A Sand And Gravel Aquifer, pp 551–558 of In Situ Aeration: Air Sparging, Bioventing, and Related Remediation Process, Ed. Robert E. Hinchee, Ross N. Miller and Paul C. Johnson. Battelle Press 1995). The remediation system included ground water recovery and oxygenation of the ground water in a packed-tower air stripper to remove volatiles and increase dissolved oxygen levels. The oxygenated water was injected back to the subsurface through horizontal injection galleries.

U.S. Pat. Nos. 5,221,159; 5,277,518 and 5,472,294 disclose methods and apparatuses for in situ removal of contaminants from soil or from ground water, or both by combination sparging and bioremediation techniques which volatilize and biodegrade the contaminants.

U.S. Pat. No. 5,277,518 discloses a method and apparatus for in situ removal of contaminants from soil or from ground water, or both by (col. 3, lines 46–54) establishing at least one injection well into the ground water; injecting oxygen-containing gas into the injection well to volatilize and biodegrade contaminants in the ground water and soil; and permitting upward migration of the volatilized and biodegraded contaminants without one or more venting conduits. In other words, no venting wells, venting laterals, or equivalent equipment is used. A sparger in the injection well introduces pressurized air into the aquifer so as to stimulate circulation of the air and mixture of the air and water. This remediation unit requires the use of air injection wells to volatilize contaminants which then migrate through the vadose zone and are vented to the atmosphere. Some of the contaminants are biodegraded by microorganisms in the soil and ground water. The air flow rates must be controlled so that the air quality standards are not exceeded by the fluids vented by the remediation unit.

U.S. Pat. No. 5,472,294 discloses a method and apparatus for in situ removal of contaminants from soil or from ground water, or both in a similar manner as disclosed in U.S. Pat. No. 5,277,518. In addition an apparatus (FIG. 11) is provided which allows the addition of supplemental oxygen-containing gas, including oxygen gas, at high pressure and low volume through a feed tube attached to the sparger. The feed tube provides the oxygen-containing gas to an expander to more widely disperse the gas into the contaminated zone.

It is an object of this invention to provide a method for the efficient removal of biodegradable contaminants from soil or ground water, or both without causing migration or volatilization of the contaminants.

It is an object of this invention to provide a method for the efficient removal of biodegradable contaminants from soil or ground water, or both without releasing the contaminants into the atmosphere.

It is an object of this invention to provide a method for the efficient removal of biodegradable contaminants from soil or ground water, or both by enhancing the rate of biodegradation of the contaminants by native microorganisms in the soil or ground water.

It is an object of this invention to provide a method for the efficient removal of biodegradable contaminants from soil or ground water, or both by ensuring complete dissolution of injected oxygen into the ground water.

SUMMARY OF THE INVENTION

The present invention is for a method of in situ removal of biodegradable contaminants from ground water or soil, or both the method comprising, injecting oxygen gas into ground water containing a biodegradable contaminant in a volume low enough to avoid migration or volatilization of the contaminant but high enough to enhance the rate of biodegradation of the contaminant.

In another aspect of the invention there is provided a method of in situ removal of biodegradable contaminants from ground water and soil, the method comprising: injecting oxygen gas into ground water containing a biodegradable contaminant in a volume low enough to ensure complete dissolution of the injected oxygen in the ground water.

In another aspect of the invention there is provided a method of in situ removal of biodegradable contaminants from ground water and soil without venting of volatile contaminants.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

The method of soil and ground water remediation at, for example, a petroleum release site according to this invention involves the injection of pure oxygen into ground water via one or more injection points at flow rates substantially lower than traditional air sparging. Injecting oxygen into the ground water at a low rate increases the dissolved oxygen levels. The oxygen flow rate is kept below that causing migration and volatilization of hazardous vapors. The need for air treatment and stripping of vapors from the air is thus eliminated.

Adequate concentrations of aerobic microorganisms exist in the soil and ground water provided there is a highly efficient transfer of oxygen into the ground water to enhance the effectiveness of the microorganisms. A desirable level of dissolved oxygen is from about 3–15 ppm, preferably 6–10 ppm, more preferably 9–11 ppm. Complete transfer efficiency is a function of selecting the optimum volume and rate of injection of the oxygen for the site conditions. The injection sites can be at multiple levels, for example, at groundwater level and at the vadose zone level. The method can also be used for the bioremediation of contaminated soil containing water by injecting oxygen directly into the water-moist soil so that the oxygen level in the water is increased.

The concentrations of microorganisms can be enhanced, if necessary, by subsurface injection of nutrients and/or additional microrganisms. Injection of nutrients or microorganisms could be made through the injection wells or monitoring wells or additional injection sites. Removal of biodegradable contaminants can be enhanced by injecting microrganisms into the ground water.

The method of the invention is illustrated for a petroleum release site having a relatively shallow ground water zone. However, it will be apparent to those with ordinary skill in this field that the method is applicable to other contaminated sites. A direct air sparge system would not be effective for a petroleum contaminated site with a thin saturated thickness due to low volatility and hazardous vapor control.

Figure 1:
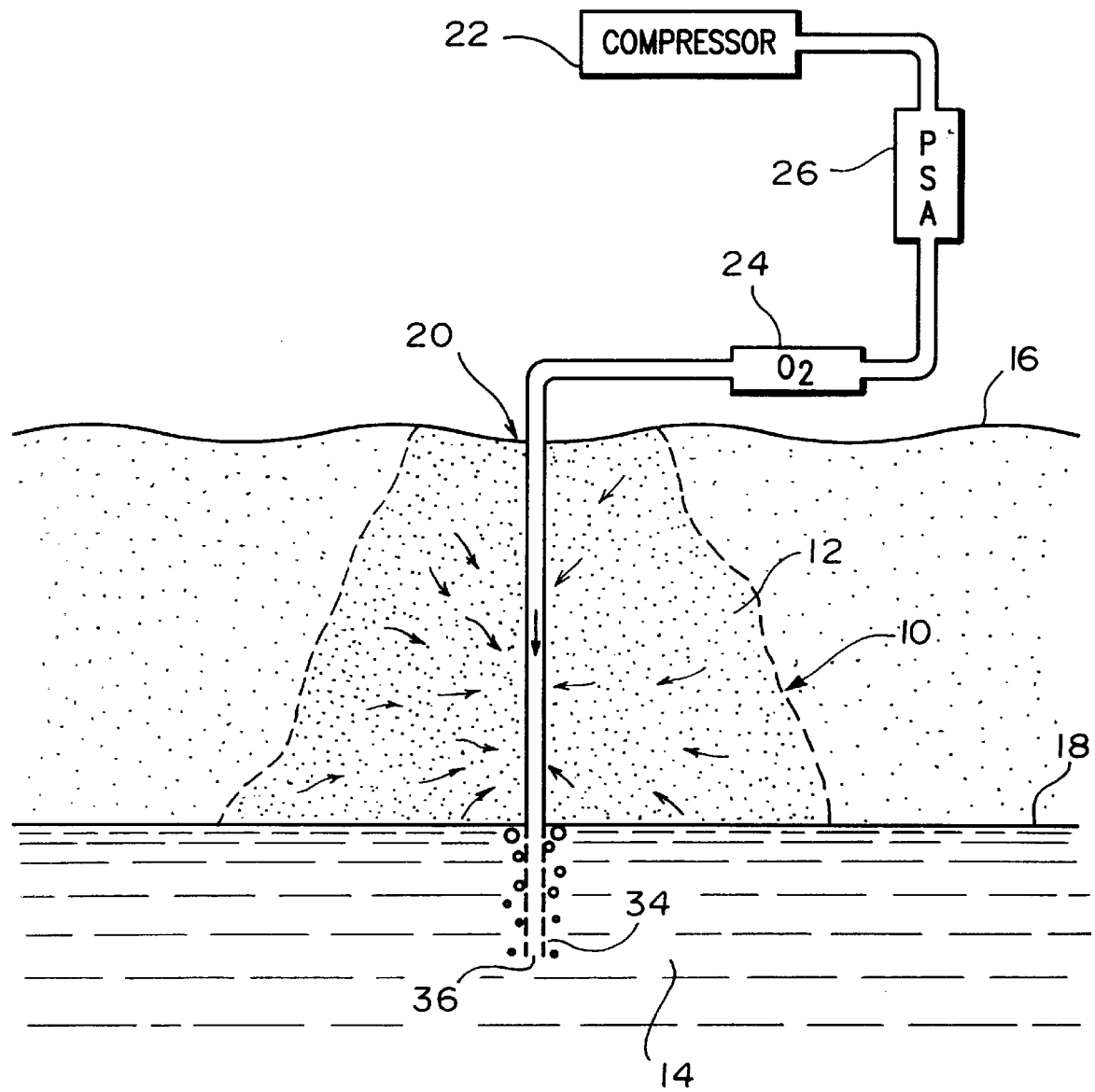
FIG. 1 illustrates in cross-section a contaminated ground water site.
Figure 2:
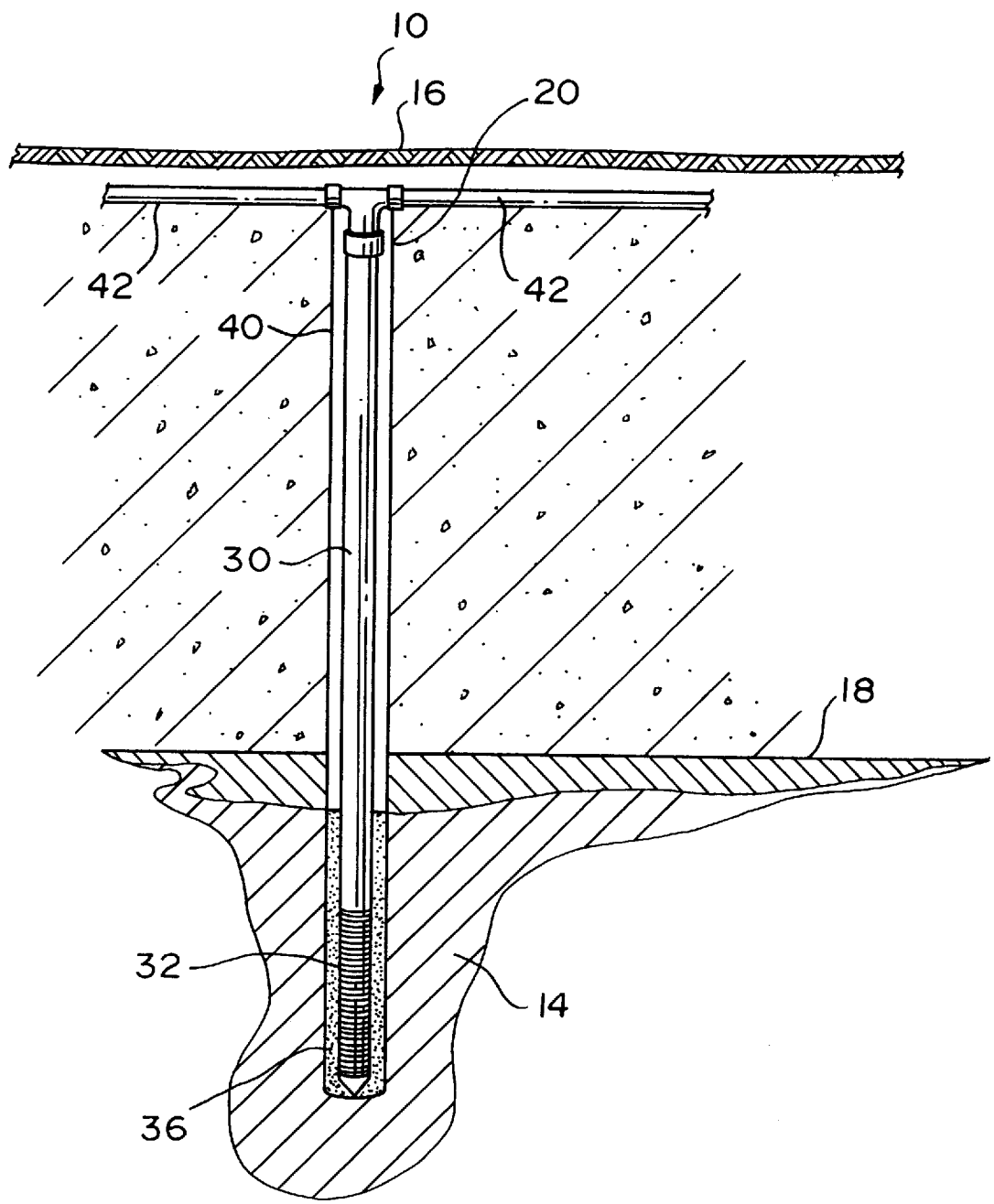
FIG. 2 illustrates in cross section an injection site.

Referring to FIGS. 1 and 2, a preferred embodiment of the present oxygen-injection system is illustrated. A contaminated site 10 wherein there is a vadose zone 12 overlying a ground water aquifer 14 is located below a ground surface 16. The upper boundary of the aquifer 14 is defined by the level of the water table 18. The vadose zone 12 and the aquifer 14 are both contaminated by petroleum due to spillage on the surface or rupture of underground storage tanks. One or more injection wells 20 extend from the ground surface 16 to a level beneath the water table 18 into the aquifer 14. The injection well 20 is connected to an oxygen storage tank 24 which is in turn connected with a pressure swing adsorption oxygen generator (PSA) 26 which is in turn connected to a compressor 22. Oxygen is introduced into the injection well 20 by the compressor 22. The compressor 22 preferably has a capacity for delivery of the oxygen at about 1 psi at a rate of approximately 7 standard cubic feet per hour (scfh) to each one of the injection sites. However, conditions for the delivery of the oxygen may vary depending on the lithology of the site and depth of the contamination. The above described oxygen delivery rate compares with the air sparging rates described in U.S. Pat. No. 5,472,294 for delivering an oxygen containing substance at about 10–300 cubic feet per minute (cfm) and at pressures of from about 1–100 psi.

The injection well 20 can be constructed with common materials such as metal or plastic pipe. In a preferred embodiment, FIG. 2, a well 20 is constructed from gas impermeable pipe 30, such as two inch polyvinyl chloride (PVC) pipe, which extends to a depth beneath the water table 18. The depth of penetration below the water table 18 depends on the thickness or extent of the contaminated portion of the ground water aquifer 14. Oxygen is introduced into the injection well pipe 30 and exits the pipe through openings, for example a perforated 0.01 screen 32, at the end of the pipe 30. The opening between the borehole of the well 20 and pipe 30 is preferably sealed above the screen 32 with a layer of gas impermeable material 40, such as a bentonite/cement mixture, to prevent migration of surface water and free contaminants to the subsurface.

The screen 32 disperses the oxygen gas 34 from the end 36 of the well into the aquifer 14 at a rate low enough to cause complete dissolution and transfer into the water of the aquifer. Oxygenated water from the aquifer reaches the vadose 12 zone by lateral migration and/or capillary action.

Contaminant-consuming microorganisms in the aquifer 14 and vadose zone 12 in presence of the enhanced oxygen levels cause increased rates of biodegradation of the contaminants. The rate of oxygen sparging is low enough to avoid migration or volatilization of the contaminant but high enough to enhance the rate of biodegradation of the contaminant. Since migration or volatilization of the contaminants is avoided it is not necessary to provide a system for venting and/or recovering the contaminants. Such recovery systems add significantly to the cost of site bioremediation.

It will be apparent that several wells 20 can be drilled and supplied with injection pipes 30 interconnected by lateral pipes 42 which receive oxygen gas from the compressor 22.

Figure 3:
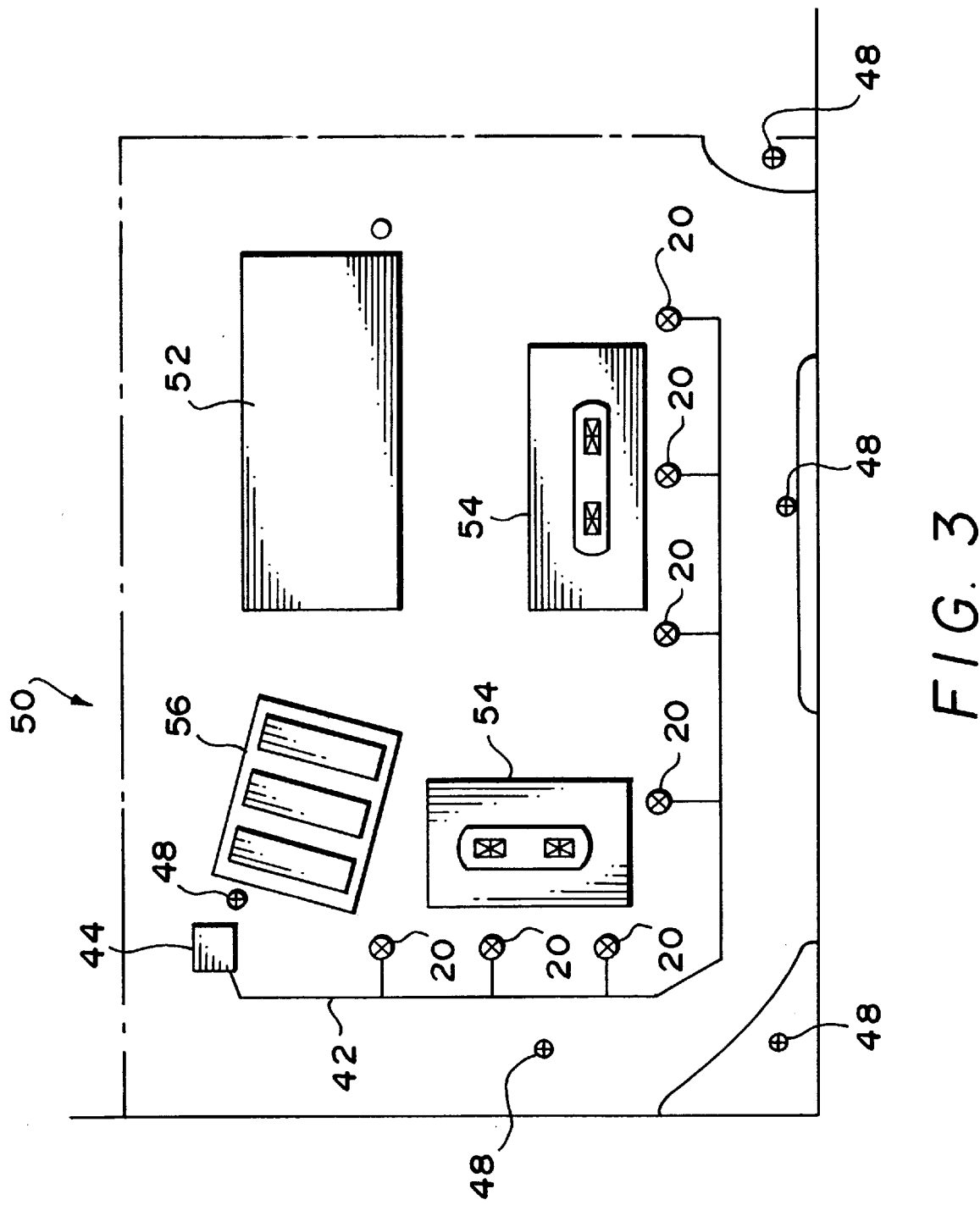
FIG. 3 is a plan view of a contaminated site.

FIG. 3 illustrates a contaminated site 50 which is being subjected to low oxygen volume bioremediation. The site includes gas station 52, pump islands 54 and underground storage tanks 56. Contamination of the subsurface soil and water table in the region of the gas station site has resulted from rupture of an underground storage tank.

The site conditions consist of a narrow vadose zone, with an average depth of 5 feet across the site. The lithology consists of approximately 5 feet of permeable sands underlain by a clay, confining layer. The ground water within this sand is encountered as a thin (less than one foot) saturated zone just above the clay. Depth to ground water is approximately 4 feet in the source area and drops to greater than 10 feet off site. Due to the steep ground water gradient, oxygen transport is considered sufficient for off site remediation. Analysis of the ground water indicates that MTBE (methyl t-butyl ether) is the primary contaminant along with BTEX (benzene, toluene, ethyl benzene and xylenes).

Injecting oxygen into the sand just above the clay, will increase the dissolved oxygen levels in the ground water, and add an oxygen rich environment to the vadose zone to enhance the in situ biodegradation of the hydrocarbons by, for example, aerobic microorganisms.

The site is provided with seven injection wells 20 connected by lateral pipes 42. The lateral pipes 42 are connected to the oxygen supply 44. Each injection point is constructed of two inch schedule 80 PVC pipe with one foot 0.01 screen installed to a depth of approximately five feet (just above the clay). The injection points are connected to a pressure swing adsorption (psa) oxygen generator rated for 80 scfh of pure oxygen (90–95%).

Each injection point is sand packed to 1.0 feet above the screen, topped with one foot of bentonite pellets and grouted to within one foot of land surface. Each point is finished with a flush-mounted curb box.

Monitoring wells (MW1–MW5) 48 are installed throughout the site to measure dissolved oxygen levels and contaminant levels.

The remediation system consists of an AirSep AS80 pressure swing adsorption oxygen generator, available from AirSep Corporation of Buffalo, N.Y., which produces oxygen at a rate of 80 standard cubic feet per hour (scfh). The oxygen is stored in a 60 gallon receiver tank and pulse sparged to the seven injection points at a rate of approximately 7 scfh per point. Oxygen is injected for 5 minutes at about 30 min. intervals, at an oxygen pressure of about 1 psi. Such an oxygen generator allows the oxygen to be generated on site and eliminates the need for transportation and delivery of hazardous oxygen tanks. The injection points are located directly downgradient of the source area and spaced to sufficiently increase dissolved oxygen levels throughout the site.

The background level of dissolved oxygen in the ground water is initially 0–1parts per million(ppm). After 6 weeks of operation the oxygen levels increase to 6–10 ppm in both on site and off site monitoring wells. Dissolved oxygen levels remain at high levels as long as the system is operational. Concentrations of both MTBE and BTEX decrease with increasing dissolved oxygen levels.

A 48 hour endpoint assay using soils obtained from the ground water interface zone confirms the biodegradation of MTBE by *Pseudomonas flourescens* type G.

The relatively low injection rate per point and high transfer efficiency into ground water negates the need for vapor control via vadose zone extraction. This eliminates costly air treatment, provides a high degree of certainty for plume control, is suitable for shallow ground water, and results in rapid biodegradation of MTBE and BTEX.

While the invention has been described in connection with a presently preferred embodiment thereof, those skilled in the art will recognize that many modifications and changes may be made therein without departing from the true spirit and scope of the invention, which accordingly is intended to be defined solely by the appended claims.

What is claimed is:

1. A method of in situ removal of biodegradable contaminants from a zone of ground water or soil, or both, the method comprising:

injecting oxygen gas into ground water of the zone in a volume low enough to avoid migration or volatilization of the contaminant but high enough to oxygenate the ground water and enhance the rate of biodegradation of the contaminant.

2. The method of claim 1, further comprising establishing at least one injection well into the ground water.

3. The method of claim 1, further comprising injecting microorganisms into the ground water.

4. The method of claim 1, further comprising generating the oxygen gas by a pressure swing adsorption oxygen generator.

5. The method of claim 1, comprising injecting oxygen gas at a rate of about 7 standard cubic feet per hour (scfh).

6. The method of claim 1, in which the oxygen gas is injected through a pipe extending through the zone.

7. A method of in situ removal of biodegradable contaminants from a zone of water-moist soil comprising:

injecting oxygen gas into water of the water-moist soil of the zone in a volume low enough to avoid migration or volatilization of the contaminant but high enough to oxygenate the water and enhance the rate of biodegradation of the contaminant.

8. The method of claim 1, in which the oxygen gas is injected through a pipe extending through the zone.

* * * * *

(12) EX PARTE REEXAMINATION CERTIFICATE (10367th)
United States Patent
Carter

(10) Number: US 5,874,001 C1
(45) Certificate Issued: Oct. 29, 2014

(54) GROUND WATER REMEDIATION METHOD

(75) Inventor: Sean R. Carter, Lawtons, NY (US)

(73) Assignee: Matrix Environmental Technologies, Orchard Park, NY (US)

Reexamination Request:
No. 90/009,965, Nov. 30, 2011

Reexamination Certificate for:
Patent No.: 5,874,001
Issued: Feb. 23, 1999
Appl. No.: 08/710,091
Filed: Sep. 11, 1996

(51) Int. Cl.
*B09C 1/00* (2006.01)
*B09C 1/10* (2006.01)

(52) U.S. Cl.
USPC ........ 210/610; 210/620; 210/747.7; 210/758; 405/128.45

(58) Field of Classification Search
None
See application file for complete search history.

(56) References Cited

To view the complete listing of prior art documents cited during the proceeding for Reexamination Control Number 90/009,965, please refer to the USPTO's public Patent Application Information Retrieval (PAIR) system under the Display References tab.

*Primary Examiner* — Jerry D Johnson

(57) ABSTRACT

A method and apparatus for in situ removal of biodegradable contaminants from ground water or soil, or both by injecting oxygen gas into ground water containing a biodegradable contaminant in a volume low enough to avoid migration or volatilization of the contaminant but high enough to enhance the rate of biodegradation of the contaminant are described.

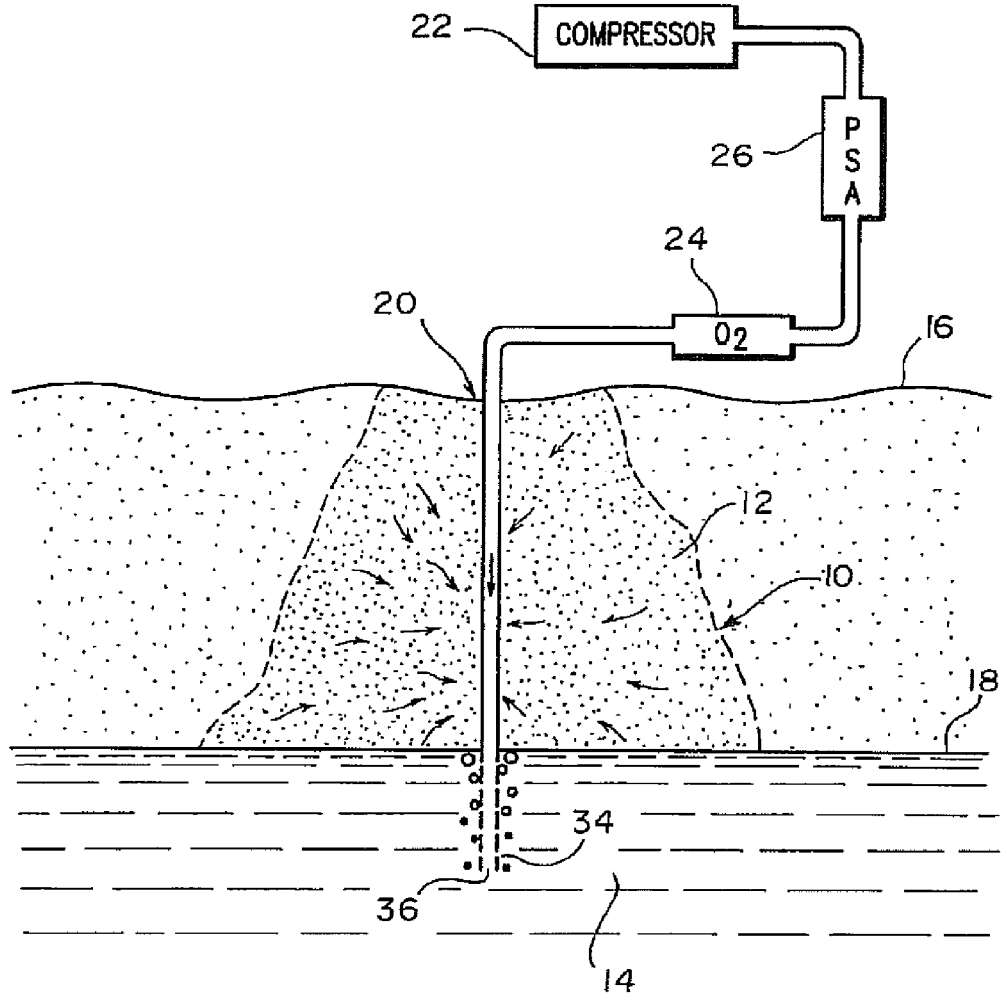

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

Claim 8 is determined to be patentable as amended.

New claims 9-12 are added and determined to be patentable.

8. The method of claim [1] *7*, in which the oxygen gas is injected through a pipe extending through the zone.

*9. The method of claim 1, wherein the injecting step comprises injecting oxygen by pulsed sparging.*

*10. The method of claim 9, wherein the oxygen is injected for five minutes at about thirty-minute intervals.*

*11. The method of claim 7, wherein the injecting steps comprises injecting oxygen by pulsed sparging.*

*12. The method of claim 11, wherein the oxygen is injected for about five minutes at about thirty-minute intervals.*

\* \* \* \* \*